No. 670,182. Patented Mar. 19, 1901.
E. MANULA.
CAN FILLING MACHINE.
(Application filed Dec. 19, 1900.)
(No Model.) 3 Sheets—Sheet 1.
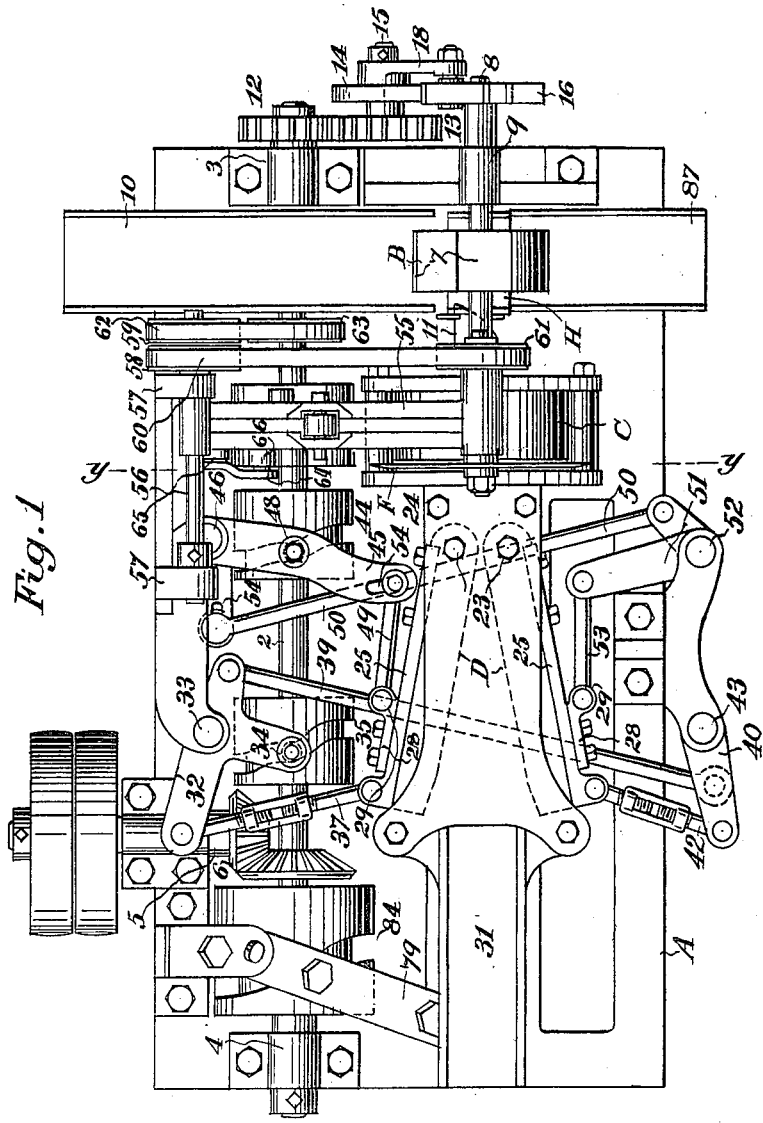

No. 670,182. Patented Mar. 19, 1901.
E. MANULA.
CAN FILLING MACHINE.
(Application filed Dec. 19, 1900.)
(No Model.) 3 Sheets—Sheet 2.
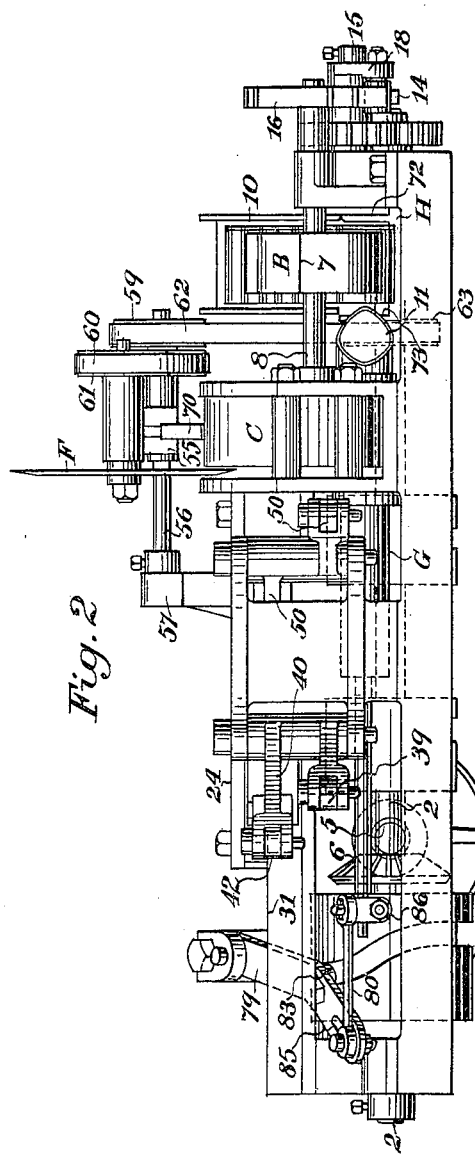
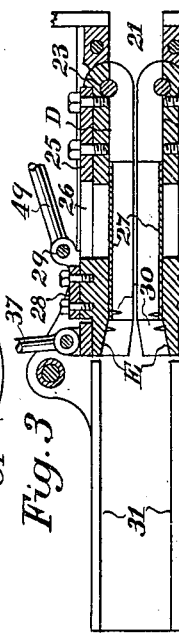
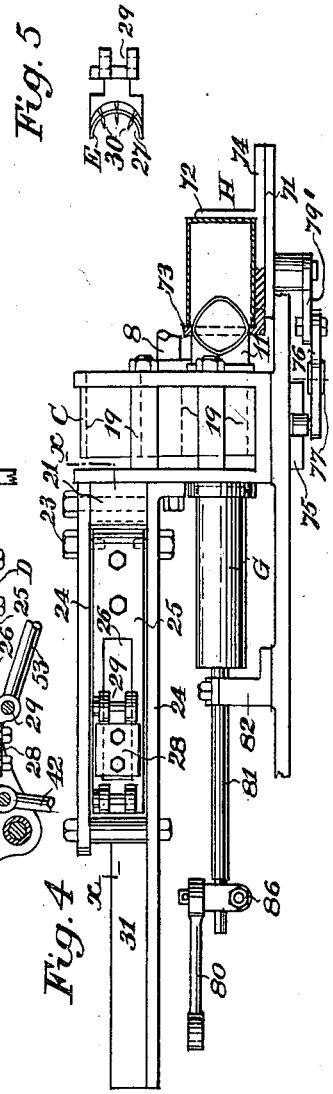
Witnesses,
Inventor,
Erik Manula No. 670,182. Patented Mar. 19, 1901.
E. MANULA.
CAN FILLING MACHINE.
(Application filed Dec. 19, 1900.)
(No Model.) 3 Sheets—Sheet 3.
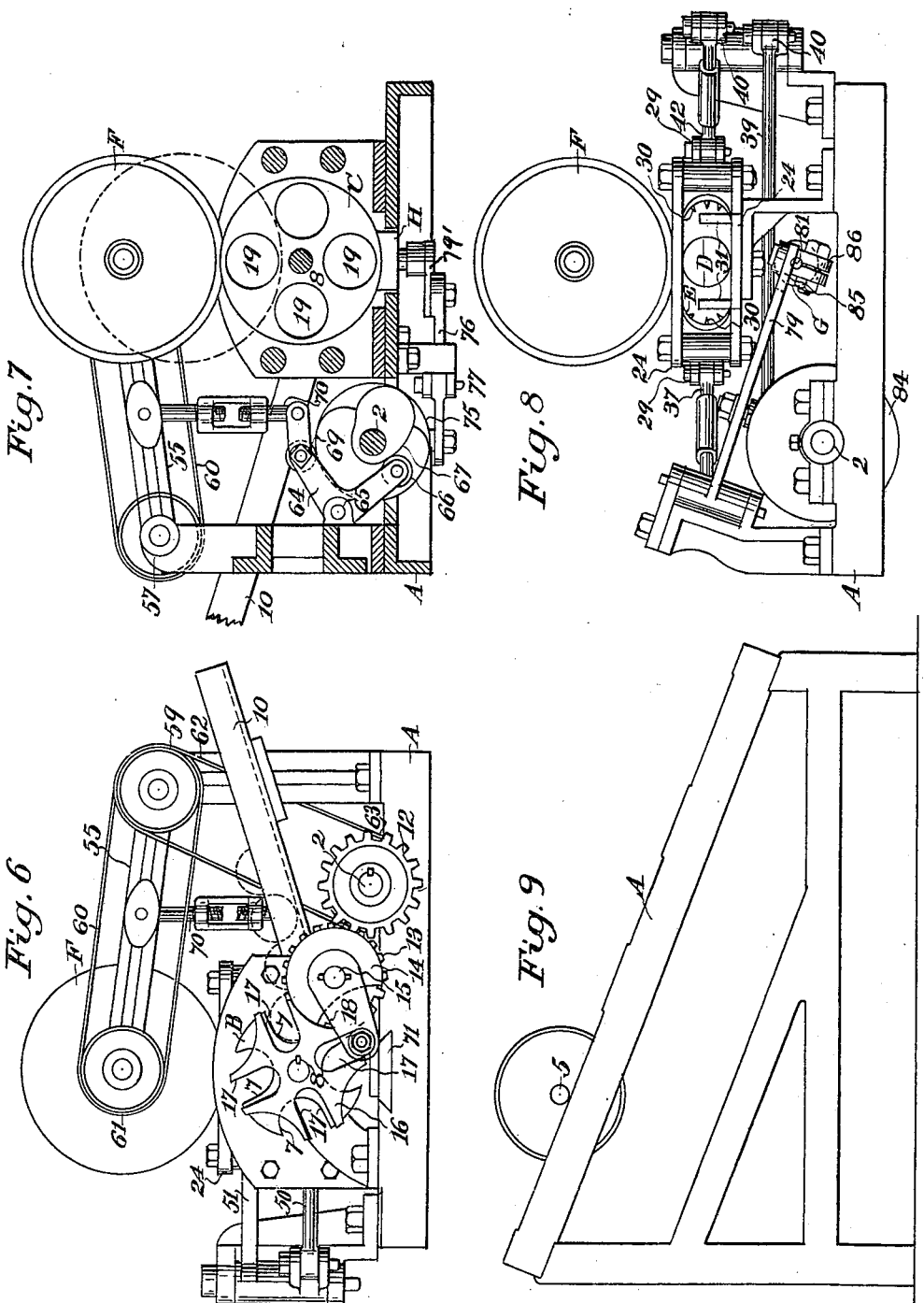

UNITED STATES PATENT OFFICE.

ERIK MANULA, OF ASTORIA, OREGON.

CAN-FILLING MACHINE.

SPECIFICATION forming part of Letters Patent No. 670,182, dated March 19, 1901.

Application filed December 19, 1900. Serial No. 40,423. (No model.)

*To all whom it may concern:*

Be it known that I, ERIK MANULA, a citizen of the United States, residing at Astoria, county of Clatsop, State of Oregon, have invented an Improvement in Can-Filling Machines; and I hereby declare the following to be a full, clear, and exact description of the same.

My invention relates to improvements in machines for the filling of cans with salmon and the like where it is desired to distribute the fat and lean portions of the meat in such a manner as to present a neater and more satisfactory appearance than is possible in the automatic packing-machines now in use.

It consists, essentially, of an intermittently-revolving can-feeder, a cylinder having therein a series of measures into which the fish is pressed and means by which these measures are successively emptied into the cans, telescopic tubular jaws into which the fish is fed and by which the fish is delivered into said measures, a revolving knife by which the fish is cut off when these measures are filled, and of details more fully to be explained in the following specification and accompanying drawings.

Figure 1 is a plan of my invention. Fig. 2 is a longitudinal elevation. Fig. 3 is a horizontal section through the segmental feeding-jaws, taken on the line $x\,x$ of Fig. 4. Fig. 4 is a longitudinal elevation of the same. Fig. 5 is a front view of a segmental tube. Fig. 6 is an elevation of the rear end. Fig. 7 is a transverse section on the line $y\,y$ of Fig. 1. Fig. 8 is an elevation of the forward end. Fig. 9 is a longitudinal elevation, on a reduced scale, of the supporting-frame for the can-filling machine.

It is well known to canners of salmon that a can filled with the bellies alone will contain too much oil, while a can filled solely with the back will be too dry; further, that the skin of the fish in the center of the cans is objectionable on account of its untidy appearance when removed from the can.

By my device I am able to fill the cans in such a manner that the fat and lean parts of the fish will be properly distributed and the skin of the fish placed against the inside of the can, thus obviating the disadvantages of the machines now commonly in use and providing a labor-saving device of greatly-increased capacity. The fish is first cut into long strips and fed to the machine in a continuous string or core with the skin outside and the parts of the belly and back in proper proportion.

Having reference to the drawings, A represents a frame suitably inclined to facilitate the passage of the fish through the machine.

2 is a main axle suitably journaled at 3 and 4 and is operated by the driving-shaft 5 through the bevel-gearing 6.

A circular can-feeder B, having four semicircular openings 7 in its periphery, is secured on an axle 8, journaled in supports 9. The cans are delivered into this feeder through an inclined trough 10. The feeder B is intermittently revolved, so that its semicircular openings 7 will alternately receive a can from the trough and carry it in line with the spout 11, through which the can receives the fish. This intermittent movement of the feeder is effected in the following manner: On the end of the main axle 2 is secured a cog-wheel 12, meshing with another cog 13, to which latter is fastened a disk 14. This cog 13 is loosely mounted on a short shaft 15. A spider 16 is secured upon the feeder-shaft 8 and has four slots 17. An arm 18 upon the disk 14 carries a roller which engages one of these slots with each revolution of the disk and moves the spider and can-feeder a quarter-turn. The disk has a cut-out portion to allow the passage of the projecting points of the spider, and the spider has its sides concaved to fit the periphery of the disk, so that the instant the roller leaves either of the slots the opposite side of the disk will engage the spider and the latter will be held stationary until the roller enters another slot. A cylinder C is also secured to the axle 8, and therefore intermittently revolved with the can-feeder B. Within the cylinder are the four measures 19, corresponding in number and position to the peripheral openings carrying the cans in the feeder B. Into these measures the fish is received and from thence delivered through the spout 11 into the cans in a manner to be shown later. The fish is admitted to these measures through a tube 21 in the following manner: Two similar segmental jaws D, forming a tube when closed, are pivoted at 23 between the two guide-plates 24. On the back of each of these jaws is fastened an arm 25, in which is a slot 26. A second pair of similar segmental jaws E are adapted to telescope within the first pair in the following manner: These jaws E are each provided with a thin semicircular sleeve 27, projecting into the jaws D. A projection 28 extends through the slots 26, and a button 29 holds the respective jaws D and E together and permits the latter to slide freely within the former. A portion of the inner periphery of these jaws E is provided with pointed teeth 30, which assist in holding the fish and projecting it forward into the measures. The fish cut into proper strips is fed into these jaws through a trough 31. The jaws E shape the fish into proper form and carry it forward into the jaws D and thence by the telescopic action of these sets of jaws into the measure. The jaws in their reopening permit the sleeves 27 to be withdrawn without any tension on the fish or any drawing of it backward. The opening and closing of these jaws are caused in the following manner: A three-armed rocker 32, pivoted at 33 in the frame, has a roller in one of its arms 34, adapted to travel in the groove of a cam 35, which latter is secured upon the main shaft 2. The longest arm of said rocker is connected by a rod 37 to one of the arms 25 of the jaws D, and the shortest arm of said rocker is connected by a rod 39 to a rocker 40 upon the opposite side of said jaws. To the longest arm of this latter rocker is connected the arm 25 of the other jaw D by a rod 42. The rocker 40 is pivoted at 43. Thus the jaws E and D are operated in unison by the revolution of the cam 35. The telescoping action of said jaws is caused by means of a cam 44 upon the shaft 2. A two-armed rocker 45 is pivoted at 46. To the longer of these arms is secured a roller 48, which travels in the groove of said cam 44. The end of this longer arm is connected by a rod 49 with the button 29 upon the adjacent jaw E, while the shorter arm is connected by a rod 50 with the shorter of two arms of a rocker 51 upon the opposite side of the jaws. This rocker 51 is pivoted at 52 and has its longer arm connected by a rod 53 to the opposite button 29. The two arms on the rocker 45 are provided with slots 54, whereby the stroke of the telescope can be regulated in length by changing the pivoting of the rods 49 and 50. Thus the jaws E are made to move in unison to and fro within the jaws D through the operation of the cam 44. As soon as the fish is fully pressed into any one of the measures 19 the revolving circular knife F severs the fish at the right moment, and a revolution of the cylinder C brings the succeeding measure into line with the jaws to be similarly filled and severed. This knife F is journaled in the end of an arm 55. The opposite end of this arm is secured upon the shaft 56. The latter is suitably journaled at 57. This shaft carries two loose pulleys 58 and 59, fastened to each other. The pulley 58 is connected by a belt 60 with a pulley 61 upon the axle of the circular knife F, and the pulley 59 is connected by a belt 62 with a pulley 63, secured upon the main axle 2. While a continuous revolution is thus transmitted from the main axle to the knife, the latter is moved downward at proper intervals in order to cut off the fish in the measure, as previously stated. This vertical movement of the knife is accomplished in the following manner: A two-armed rocker 64, pivoted at 65 in the frame, has a friction-roller 66 in its shorter arm, which travels on the periphery of a cam 67 upon the main shaft 2. The longer arm of this rocker bears a similar roller, which travels on the periphery of the cam 69, and said longer arm is connected by a rod 70 to the arm 55, which carries the knife. This rod 70 is adjustable in length to regulate the downward scope of the knife. As soon as the fish is thus cut the measure and can-feeder are actuated to make a quarter-revolution, as previously described, placing another empty measure in line with the jaws, bringing a filled measure between the spout 11 and the plunger G, and causing the feeder to convey an empty can from the trough and place it upon a sliding plate H, by which plate the can is pushed over the spout to receive its charge of fish. This holder is composed of a bottom plate 71 and the standards 72 and 73. The standard 72 serves to force the can onto the spout when the holder moves inward, while the standard 73, which fits the exterior of the spout, serves to remove the can from the spout when the sliding holder is moved outward. The said holder is guided on the frame by two gibs 74 and is reciprocated by intermediate connections with a cam 75, as follows: A lever 76, centrally pivoted at 77, has a friction-roller at one end, that travels in the groove of a cam 75 upon the main shaft 2, and the other end of this lever is connected by a rod 79' to the sliding holder. This holder acts to push the can sufficiently forward while it is passing the front of the spout in order to insure an entrance thereon and then continues its pressure on the can until the latter is fully forced on the spout and, after the feeder has stopped moving. Thereupon the plunger G is immediately actuated to move into the measure, force the fish before it through the spout G into the can, and following therein until the fish is entirely removed from the spout. This spout serves to guide the fish into the can, and its cut-away upper portion permits the air to escape from the can while being filled. The movement of said plunger G is effected as follows: A long lever 79 is pivoted at one end in the frame A, and its opposite end is connected by a link 80 to the end of a piston 81, to which the plunger G is attached. A guide 82 serves to steady the movements of these parts. This said lever 79 carries a friction-roller 83, which travels in the groove of a cam 84 upon the main shaft 2. A lever is provided with an adjustable end 85 to regulate the length of the stroke with a plunger, and the piston 81 is connected to the link 80 by a split collar 86, by which the position of the plunger may be adjusted. While the plunger is acting to fill a can an empty measure is being filled from the jaws. As soon as the plunger is removed from the measure the latter, with its can-feeder, makes its quarter-revolution, by which a filled can is delivered into the discharge-chute 87 and an empty can is carried from the feeding-trough to the spout 11, and thus the action of filling and discharging is automatically continued.

Having thus described my invention, what I claim as new, and desire to secure by Letters Patent, is—

1. The combination in a can-filling machine of tubular telescoping jaws into which the fish is delivered, means by which these jaws are actuated and means by which the fish thus pressed into shape in the jaws is delivered into the cans.

2. The combination in a can-filling machine of tubular telescoping jaws into which the fish is delivered and shaped, means by which these jaws are actuated and the fish delivered thence into measures and means by which the fish is severed when a measure is filled, and means by which the measures are emptied into the cans.

3. The combination in a can-filling machine of tubular telescoping jaws into which the fish is delivered and shaped, means by which the jaws are actuated and the fish thence delivered into measures, means for severing the fish when a measure is filled, and an intermittently-operating plunger by which the fish is forced from the measures into the cans.

4. In a can-filling machine, the combination of tubular telescoping jaws into which the fish is fed and shaped, means by which the fish is delivered into measures, a revolving knife by which the fish is severed when a measure is filled, a plunger by which the fish is removed from the measures into the cans, and means by which the cans are brought into position before the measures.

5. The combination in a can-filling machine of tubular telescoping jaws into which the fish is fed, means by which these jaws are actuated and the fish forced forward into measures, a revolving knife by which the fish is severed from the measures, a revolving carrier by which cans are brought successively in line with a corresponding measure, and means by which the fish is delivered from a measure into a can.

6. The combination in a can-filling machine, of means by which the fish is forced into measures carried within a revolving support, a revolving knife by which the fish is severed from the measures, a revolving carrier upon which the cans are delivered and by which they are placed successively before a filled measure, means by which a can is held against the measure while a plunger forces the fish from the measure into the can, and by which the filled can is then removed, and means by which these various parts are actuated intermittently, and in unison.

7. The combination in a can-filling machine of a pair of tubular jaws, a second pair of tubular jaws having projecting points or teeth on their inner surfaces, a smooth sleeve projection on each of these jaws slidable within the first set of jaws, means by which these jaws are opened in unison, and into which the fish is fed, and when these jaws are closed, means by which the second pair is made to telescope within the first and carry the fish forward and force it into measures within a revolving support, a revolving knife by which the fish is severed from these measures, and means by which the fish is delivered from these measures into the cans.

8. The combination in an automatic can-filling machine of tubular telescoping jaws into which the fish is fed in a continuous string, means by which these jaws are actuated and the fish forced into measures within an intermittently-revolving support, a revolving knife moved intermittently to sever the fish from a measure when filled, an intermittently-revolving carrier upon which the cans are received, a sliding holder into which the cans are delivered, and by which they are moved and held against a measure while the fish is being forced from the latter into the can, a plunger by which this removal of the fish from the measures is effected, and means by which the action of the jaws, and the intermittent movements of these various parts are executed in unison.

In witness whereof I have hereunto set my hand.

ERIK MANULA.

Witnesses:
  E. G. ROGERS,
  BURR OSBURN.